United States Patent [19]

Hort

[11] 4,009,326

[45] Feb. 22, 1977

[54] PHOTOCONDUCTIVE POLYMER AND METHOD OF MANUFACTURE

[75] Inventor: Eugene V. Hort, Wayne, N.J.

[73] Assignee: GAF Corporation, New York, N.Y.

[22] Filed: July 31, 1975

[21] Appl. No.: 600,889

[52] U.S. Cl. .................................. 526/47; 96/1.5; 428/511; 526/23

[51] Int. Cl.$^2$ ............... C08F 126/12; C08F 26/12; C08F 226/12

[58] Field of Search ............... 260/88.3 R; 526/23, 526/47

[56] References Cited

UNITED STATES PATENTS

| | | | |
|---|---|---|---|
| 2,706,701 | 4/1955 | Beller et al. | 260/88.3 L |
| 3,507,706 | 4/1970 | Webb | 260/88.3 R |
| 3,702,764 | 11/1972 | Kinjo et al. | 260/88.3 R |
| 3,705,031 | 12/1972 | Kinjo et al. | 260/88.3 R |
| 3,764,316 | 10/1973 | Dailey et al. | 260/88.3 R |

*Primary Examiner*—Harry Wong, Jr.
*Attorney, Agent, or Firm*—Walter C. Kehm; Joshua J. Ward

[57] ABSTRACT

A photoconductive iodinated poly(vinyl carbazole) having a mole ratio of iodine to vinyl carbazole between 0.05 and 0.9. The iodinated poly(vinyl carbazole) is used to form a photoconductive layer or coating on a substrate such as a transparent substrate or paper. The iodinated poly(vinyl carbazole) is formed by reacting a slurry of poly(vinyl carbazole) having a high surface area, typically above about 10 m$^2$/gram, with a source of iodide and of iodate ions.

7 Claims, No Drawings

PHOTOCONDUCTIVE POLYMER AND METHOD OF MANUFACTURE

BACKGROUND OF THE INVENTION

This invention relates to a photoconductive iodinated poly(vinyl carbazole) composition and its method of preparation. More particularly, the present invention relates to a photoconductive iodinated poly(vinyl carbazole) composition formed by reacting a source of iodine with a poly(vinyl carbazole) prepared by precipitation polymerization.

Photoconductive polymers are useful in electrostatographic processes wherein an electrostatic latent image is produced on a surface of the polymer. The electrostatic latent image then is developed with a colored toner composition by means well-known in the art. For use in electrostatographic processes, a layer of the photoconductive polymer can be applied to a base sheet such as paper or a transparent or opaque polymeric composition or can be applied to a conductive plate. In the former instance, the latent image is generally developed and subsequently is fused thereon. In the latter instance, the latent image generally is developed and fused thereon or transferred to a base sheet such as paper and is fused thereon.

The most commonly employed photoconductive material wherein development and fusion is effected on the same surface comprises a composition of photoconductive zinc oxide particles dispersed in a transparent resin binder which composition is coated on a paper sheet. However, these compositions are opaque and are not useful in forming a developed image on a transparent background such as microfilm or transparencies. In addition, images developed on zinc oxide are undesirably grainy. In order to permit forming transparencies, the photoconductive layer and any substrate to which it is applied must be transparent. Such photoconductive compositions should have a high dark resistivity; that is, should be capable of holding a high proportion of electrostatic charge applied thereto in the dark. In addition, the photoconductive composition should be capable of quickly dissipating the applied electrostatic charge when exposed to light. Furthermore, the photoconductive composition should be capable of being sensitized so that it is spectrally responsive in the visible region of the spectrum without the need for employing high concentrations of sensitizing dyes that would significantly reduce the transparency of the composition.

It is known that iodinated poly(vinyl carbazoles) exhibit photoconductive properties. However, either for reasons associated with the known methods for preparing these polymers or because of other associated properties of these polymers, they have not been so-utilized. For example, it has been proposed in Japanese Patents 7591/68 and 7492/68 to form photoconductive iodinated poly(vinyl carbazoles) having at least 1 atom of iodine per molecule of the vinyl carbazole by forming either 3,6-di-iodo-9-vinylcarbazole or 3-iodo-9-vinylcarbazole from 9-chloroethylcarbazole by iodination and dehydrochlorination and subsequently polymerizing the iodinated monomer. Unfortunately, the 9-chloroethylcarbazole is expensive and difficult to obtain and the process is difficult and expensive. Therefore, the resultant iodinated polymer obtained therefrom is uneconomical and difficult to make with any significant degree of purity. These factors have severely limited the usefulness of the resultant product and have prevented their commercial utilization as photoconductive materials.

Also, it has been proposed in U.S. Pat. No. 3,507,706 to form a complex of iodine and poly(vinyl carbazole) having photovoltaic properties which prevent the final composition from being commercially useful as a photoconductive layer. In one procedure, poly(vinyl carbazole) is dissolved in a solvent to which iodine is added or has been added. Thereafter, the solvent and excess iodine are evaporated to leave poly(vinyl carbazole) complexed with iodine. This composition is undesirable in at least three major respects. First, impurities are formed in the product which degrade its photoconductive properties and which are extremely difficult to remove. In addition, the resultant product is colored so that its decreased transparency is reduced to the extent that it is not useful as a coating for white paper to form a commercially acceptable paper product or for use in forming transparencies. Finally, and most importantly, the composition is unstable and its iodine can be vaporized or reduced by reducing agents. It has also been proposed in this patent to form the iodinated polymer by exposing a film of poly(vinyl carbazole) to iodine vapors. However, this procedure produces compositions with the same disadvantages, also having limited or no commercial use.

It would be desirable to provide a transparent photoconductive iodinated polymeric composition exhibiting good dark resistivity as well as high speed electrostatic charge dissipation when exposed to light. In addition, it would be desirable to provide such a composition and a method for preparing the same which avoids the need of using expensive starting materials or the need for purifying the product. Furthermore, it would be desirable to provide such a composition which can be sensitized to visible light without significantly reducing the transparency thereof to visible light.

SUMMARY OF THE INVENTION

This invention is based upon the discovery that photoconductive, essentially transparent, polymeric compositions can be formed by iodinating a slurry of poly(vinyl carbazole) particles prepared by precipitation polymerization which have a high surface area, typically above about 10 $m^2$/gram and preferably above about 50 $m^2$/gram, in a dispersant or diluent with an iodinating mixture comprising a source of iodide ions and a source of iodate ions and thereafter separating the particles from the dispersant or diluent. Iodination preferably is conducted under conditions which avoid an excess of iodate during reaction and under conditions to substantially avoid solubilizing the poly(vinyl carbazole). The resultant polymeric product contains iodine in a concentration of between about 0.05 and 0.9, preferably 0.1 to 0.5 atoms of iodine per carbazole molecule. This polymeric product is converted to a photoconductive layer by dissolving it in a solvent, applying the resultant solution to a substrate such as paper or a transparent or opaque polymer or, a conductive substrate and thereafter, evaporating the solvent.

DESCRIPTION OF SPECIFIC EMBODIMENTS

It is essential to the practice of the present invention that the poly(vinyl carbazole) employed as a starting material have a porous structure and high surface area. Representative suitable poly(vinyl carbazoles) and their methods of preparation are disclosed in U.S. Pat. Nos. 3,679,637 and 3,679,645, assigned to GAF Corporation, both of which are incorporated herein by reference. The poly(vinyl carbazole) particles produced by the precipitation polymerization processes disclosed in these patents have a porous structure and high surface area and have a molecular weight within a wide range depending upon the particular process by which the polymer is formed. While the photoconductive properties of the iodinated products of this invention are largely independent of the molecular weight of the starting poly(vinyl carbazole), it should be noted that very low molecular weight poly(vinyl carbazole) having a relative viscosity, when measured at a 1% concentration in benzene at 25° C., of below about 1.2 tends to be a relatively poor film former and lacks the mechanical strength of high molecular weight poly(vinyl carbazole). Therefore, it is preferred to employ a poly(vinyl carbazole) having a molecular weight corresponding to a polymer having a relative viscosity above about 1.2 in order to provide commercially satisfactory products.

Iodination is carried out in an acidic liquid medium in the presence of a source of iodine comprising a mixture of an ionic iodide and an ionic iodate. Iodination is preferably carried out in a manner to avoid a stoichiometric excess of iodate to iodide for forming iodine in the reaction medium. It has been found that if excess iodate is present, the resultant iodinated poly(vinyl carbazole) is darker in color and contains some insoluble material when it is subsequently dissolved in a solvent for coating a film. It has been shown that the use of excess iodate leads to incorporation of more iodine but to reduced solubility of the product. Accordingly, it is preferred to conduct the iodination procedure by adding the iodate slowly to a slurry of the poly(vinyl carbazole) particles and the iodide.

Representative suitable ionic iodides include sodium iodide, potassium iodide, hydriodic acid or mixtures thereof. Suitable iodates include potassium iodate, sodium iodate or mixtures thereof.

The iodination procedure is carried out in an acidic diluent which is essentially a non-solvent for the poly(vinyl carbazole) but which is at least partly a solvent for the iodide and iodate reactants. Representative suitable acidic diluents include acetic acid, propionic acid, formic acid, or the like. It is not considered preferable to employ aqueous solutions of the acids as a diluent since the use of the aqueous rather than anhydrous organic acid reduces the solubility of the iodinated product. The reactants are stirred at an elevated temperature of between about 70° and about 125° C., preferably between about 80° and 120° C, for a period of time sufficient to effect substantially complete reaction. As noted above, the reaction is conducted under conditions to prevent an excess of iodate being present such as by slowly adding iodate to the slurry of poly(vinyl carbazole) and the iodide. It is postulated that, in the reaction mixture, the iodide and the iodate react to form iodine which in turn reacts with the poly(vinyl carbazole) to form the iodinated polymer and hydrogen iodide by-product. The hydrogen iodide reduces additional iodate ion to form water and iodine; the latter being reactive with the carbazole as set forth above. By operating in this manner, a reaction is generally complete within about 24 hours after initiating reaction.

The polymer particles then can be removed from the reaction system by any suitable means such as filtration, centrifugation or the like. The polymer particles should be washed subsequently with water and/or other solvents to remove any excess alkali metal or iodine by-products.

While iodination of the poly(vinyl carbazole) is effected with iodine produced from the iodide and the iodate, surprisingly, it has been found that satisfactory iodinated poly(vinyl carbazole) cannot be obtained by the direct iodination of the poly(vinyl carbazole) with iodine. It has been found that when this latter procedure is attempted, the resultant product is unsatisfactory since it is highly colored and insoluble. Therefore, the iodinated product obtained in this manner cannot be formed into a film for use as a photoconductive coating.

The products of the present invention provide substantial advantages over those obtained by the prior art procedures. Thus, the products of this invention can be utilized to form transparent photoconductive layers or coatings unlike many of the iodinated poly(vinyl carbazole) products of the prior art. In addition, the products of this invention can be formed from poly(vinyl carbazole) which in turn is formed from a vinyl carbazole rather than the difficult-to-obtain and expensive starting materials such as iodine-containing vinyl carbazoles. In addition, since the iodination procedure of the present invention does not utilize the step wherein the non-iodinated poly(vinyl carbazole) is dissolved in a solvent, the soluble by-products of the reaction are not intimately associated with or absorbed on the polymeric particle thereby promoting ease of separation of the iodinated poly(vinyl carbazole) from impurities formed during reaction. In contrast, when the polymer is formed in a reaction system wherein it is dissolved, it is extremely difficult to remove impurities therefrom. Thus, the process of this invention provides substantial economic advantages over that of the prior art.

The iodinated poly(vinyl carbazole) of this invention comprises particles which are iodinated on the surface thereof including the surface of the pores, but are essentially non-iodinated beneath this surface. Thus, the poly(vinyl carbazole) of this invention is iodinated in a non-homogeneous manner and wherein the iodine atoms are present at an average concentration in the range of from about 0.05 to about 0.9, preferably about 0.1 to about 0.5 atoms of iodine per carbazole molecule. When employing poly(vinyl carbazole) prepared by other than precipitation polymerization, the porosity and surface area are lower and the degree of polymer iodination obtained is unsatisfactory in that it is less than that necessary to form a product having good photoconductive characteristics.

Photoconductive layers or coatings can be formed from the products of this invention by rendering the iodinated poly(vinyl carbazole) in liquid form by dissolving it in a solvent. Thereafter, the liquid containing the iodinated poly(vinyl carbazole) can be applied as a coating to a substrate such as paper and allowed to solidify thereon either by cooling or by allowing the solvent to evaporate. Representative suitable solvents include tetrahydrofuran, ethylene dichloride, chloroform, dioxane or the like.

The photoconductive compositions of the present invention are light sensitive in the ultraviolet and near ultraviolet portion of the electromagnetic spectrum. When it is desirable to render the compositions of this invention light-sensitive in the visible region, a dye can be added to the liquid polymeric composition prior to applying it to a substrate such as paper or a transparent material such as polyesters, cellulose esters, polycarbonates, or glass. The dye serves to shift the spectral response of the photoconductive layer into the visible spectrum thereby permitting the use of a light source which emits visible light rather than only ultraviolet or near ultraviolet light when forming an electrostatic latent image thereon. This is desirable since it makes more efficient use of the light source in the apparatus employed to conduct the electrostatic copying process. Since some of the dyes employed for this purpose will also color the transparent coating to some extent, it is often desired to employ as little dye as necessary to effect the desired spectral shift in order to avoid coloring the iodinated poly(vinyl carbazole) polymer. Representative suitable dyes include Rhodamine B, Rhodamine, Rose Bengal, Crystal Violet, methyl violet, methylene blue, or the like. The sensitizing dyes should not be used in excessively high concentrations when the transparency of the photoconductive polymer must be preserved. Generally, the desired degree of sensitization without seriously reducing polymer transparency can be attained with between about 1 and about 10 mg, preferably 1 and 3 mg. dye per gram of polymer.

Since the photoconductive polymers of the present invention are essentially transparent and are free of precipitated material, they can be used to form photoconductive transparencies and imaged transparencies resulting from electrostatic processes utilizing the photoconductive polymer. Thus, the products of this invention provide substantial advantages over a zinc oxide-containing coating since the zinc oxide-containing coating is opaque and grainy and is not suitable as a transparency.

In addition to the advantages set forth above for the products of this invention, it should be noted that the products of this invention also display greatly increased light sensitivity and dark resistivity as compared to chlorinated or brominated poly(vinyl carbazole) prepared by the steps employed in the process of this invention. Thus, in this respect, the iodinated poly(vinyl carbazole) of this invention provides further surprising and unexpected results.

The following examples illustrate the present invention and are not intended to limit the same. Unless otherwise indicated, all percentages and parts are by weight.

EXAMPLE I

This example illustrates the method of this invention and also illustrates the superior photoconductive properties of the products of this invention as compared with chlorinated poly(vinyl carbazole) or brominated poly(vinyl carbazole).

Into a 250 ml. 4-neck flask was charged 10.0 grams of powdered poly(vinyl carbazole) (PVK) having a relative viscosity, as measured at a 1% concentration in benzene at 25° C., of 1.74 which was prepared in accordance with the procedure set forth in U.S. Pat. No. 3,679,645. In addition, 150 ml. glacial acetic acid and 2.92 grams (0.50 equivalents) of potassium iodide were added to the flask. The resultant slurry was heated to 90° C. for about 1.5 hours. Thereafter, 1.88 grams (0.50 equivalents) of potassium iodate was added slowly to the slurry over a period of about 60 minutes. The resultant slurry was stirred continuously at 90° C., for about 18 hours. Thereafter, the slurry was filtered and washed on a Buchner funnel thoroughly, first with acetic acid and subsequently with water. The resultant polymeric material was dried in an oven at 90° C., and thereafter was recovered as 12.4 grams of a pale tan powder. The product contained 21.5% iodine which corresponds to a mole ratio of iodine to vinyl carbazole of 0.42.

The corresponding chlorinated and brominated poly(vinyl carbazole) were prepared by conventional halogenation procedures.

Each of the halogenated PVK polymers was evaluated for photoconductivity, as was the unhalogenated PVK starting material, by coating clean aluminum plates with a 10% solution of each polymer in ethylene dichloride to a coating weight of 99 – 100 mg. per 25 square inches of plate. Each of the coated plates was charged by means of a corona discharge. The times required for decay to ¼ voltage under different illumination intensities are set forth in Table I.

TABLE I

| Halogen | Mole ratio halogen/PVK | 100 foot candles Charge, Volts | Speed, Secs. | 30 foot candles Charge, Volts | Speed, Secs. |
|---|---|---|---|---|---|
| Control | 0 | 750 | >10 | 840 | >10 |
| Chlorine | 0.95 | 790 | 1.3 | 810 | 2.5 |
| Chlorine | 0.46 | 640 | 1.2 | 670 | 3.2 |
| Bromine | 0.97 | 650 | 1.5 | 700 | 4.0 |
| Bromine | 0.46 | 620 | 1.6 | 650 | 4.7 |
| Iodine | 0.82 | 170 | 0.4 | 180 | 0.8 |
| Iodine | 0.43 | 720 | 0.4 | 530 | 1.6 |

As shown in Table I, both of the iodinated poly(vinyl carbazoles) exhibited greatly improved photoconductivity as compared to either the chlorinated or the brominated poly(vinyl carbazoles). As shown in Table I, the preferred iodinated poly(vinyl carbazole) of these two is that having a mole ratio of iodine to vinyl carbazole of 0.43 since this polymer exhibited higher dark resistivity as compared to the other iodinated poly(vinyl carbazole).

EXAMPLE II

This example illustrates that the iodinated poly(vinyl carbazoles) of this invention can be prepared from poly(vinyl carbazole) regardless of whether the poly(vinyl carbazole) is prepared with a peroxide catalyst or an azo catalyst.

A plurality of samples of poly(vinyl carbazole) were prepared in accordance with the procedure of U.S. Pat. No. 3,679,645 while utilizing either t-butyl peroxypivalate or azobisisobutyronitrile as the polymerization catalyst. Each poly(vinyl carbazole) sample then was iodinated in accordance with the procedure of Example I. The iodinated polymers were dissolved in ethylene dichloride as 10% solutions to determine their color. The results are set forth in Table II.

TABLE II

| Catalyst | Relative Viscosity of PVK as 1% solution in benzene at 25° C. | Mole Ratio Iodine/PVK | Appearance of 10% Solutions in Ethylene Dichloride |
|---|---|---|---|
| Peroxide | 1.62 | .14 | Clear pale amber |
| Peroxide | 1.62 | .26 | Clear sl. darker amber |

TABLE II-continued

| Catalyst | Relative Viscosity of PVK as 1% solution in benzene at 25° C. | Mole Ratio Iodine/PVK | Appearance of 10% Solutions in Ethylene Dichloride |
|---|---|---|---|
| Peroxide | 1.62 | .45 | V. Hazy pale amber |
| Azo | 1.87 | .094 | Clear pale amber |
| Azo | 1.87 | .31 | V. sl. hazy pale amber |
| Azo | 1.87 | .52 | V. hazy pale amber |
| Azo | 1.87 | .45 | Mod. hazy pale amber |
| Azo | 1.84 | .43 | Mod. hazy pale amber |

As shown in Table II, each of these iodinated polymers exhibited satisfactory color properties which permits their use in transparencies.

EXAMPLE III

This example illustrates that the iodinated poly(vinyl carbazoles) of this invention exhibit good dark resistivity and good speed when exposed to light.

Iodinated poly(vinyl carbazoles) having varying iodine concentrations were prepared in accordance with the procedure of Example I and were subsequently used to form a coating by being dissolved in various solvents and coated on either an aluminum support or a conductive paper support supplied by the Riegel Paper Company. For purposes of contrast, two control photoconductive polymeric compositions were prepared. One of the controls was poly(vinyl carbazole) containing no iodine. The other control was a 2:1 copolymer of vinyl carbazole and acrylonitrile.

Each of the polymers was coated on a 25 inch square substrate at varying weights as indicated in the Table III below. Thereafter, each of the polymers was subjected to a corona discharge and subsequently exposed to light to determine the dark resistivity and the speed of each polymer. The results are shown in Table III.

As shown in Table III, each of the iodinated poly(vinyl carbazole) products of this invention exhibit good charge acceptance and good speed which permits their use as a photoconductive layer in an electrostatic copying process.

EXAMPLE IV

This example illustrates that the iodinated poly(vinyl carbazole) of this invention can be light sensitized with minor amounts of a sensitizing dye to shift the spectral response of the polymer into the visible portion of the spectrum.

Each of the iodinated poly(vinyl carbazoles) set forth in Table IV was prepared in accordance with the procedure of Example I. Each polymer sample subsequently was coated on aluminum from a solution of ethylene dichloride.

As shown in Table IV, Rhodamine B increases the speed of the iodinated poly(vinyl carbazole) with an increase of sensitizer concentration.

TABLE III

| Sample No. | Wt. % Iodine | Mole Ratio Iodine/Vinyl Carbazole | Solvent | Support | Coating Wt.-mg. | Relative Viscosity of Starting PVK (1% Benzene) | Charge Acceptance Volts | Speed 100 Foot Candles Voltage Decay Secs. |
|---|---|---|---|---|---|---|---|---|
| 1 | 12.0 | 0.21 | Methylene Chloride | Aluminum | 115 | 1.67 | 330 | .7 |
|   |   |   |   |   | 222 |   | 680 | .6 |
|   |   |   | Ethylene Chloride | Aluminum | 60 |   | 480 | .6 |
| 2 | 22.2 | 0.43 | Methylene Chloride | Aluminum | 167 | 1.67 | 540 | .4 |
|   |   |   |   | Paper | 114 |   | 360 | .4 |
|   |   |   |   | Paper | 51 |   | 180 | .5 |
|   |   |   | Ethylene Chloride | Aluminum | 192 |   | 560 | .6 |
|   |   |   |   | Aluminum | 186 |   | 680 | .3 |
| 3 | 22.8 | 0.45 | Methylene Chloride | Aluminum | 187 | 1.15 | 360 | .4 |
|   |   |   |   | Aluminum | 172 |   | 390 | .3 |
|   |   |   |   | Aluminum | 124 |   | 400 | .3 |
|   |   |   |   | Aluminum | 99 |   | 480 | .4 |
|   |   |   |   | Paper | 195 |   | 180 | .3 |
|   |   |   |   | Paper | 141 |   | 210 | .3 |
|   |   |   |   | Paper | 102 |   | 120 | .5 |
| 4 | 29.3 | 0.63 | Methylene Chloride | Aluminum | 136 | 1.67 | 340 | .4 |
|   |   |   | Ethylene Chloride | Aluminum | 198 |   | 780 | .3 |
| 5 | 35.1 | 0.82 | Methylene Chloride | Aluminum | 168 | 1.67 | 160 | .8 |
|   |   |   | Ethylene Chloride | Aluminum | 337 |   | 540 | .5 |
|   |   |   |   | Aluminum | 116 |   | 460 | .6 |
| 6 | 2:1 Vinyl Carbazole Acrylonitrile Copolymer |   | Methylene Chloride | Aluminum | 140 |   | 820 | +16 |
|   |   |   |   | Aluminum | 138 |   | 660 | +16 |
|   |   |   | Ethylene Chloride | Aluminum | 105 |   | 390 | +10 |
|   |   |   |   | Aluminum | 92 |   | 520 | +10 |
| 7 | 0 | 0 | Methylene Chloride | Aluminum | 52 | 1.15 | 300 | +10 |
|   |   |   |   | Paper | 186 |   | 200 | +12 |
|   |   |   |   | Paper | 98 |   | 320 | +12 |

TABLE IV

| Sample No. | Mole Ratio Iodine/Vinyl Carbazole | Rhodamine B, mg. | Charge, Volts | Exposure to 30 Foot Candles Speed to 1/2 Voltage, Sec. |
| --- | --- | --- | --- | --- |
| 1 | 0 | 0 | 300 | >10 |
| 2 | 0 | 2 | 240 | 8 |
| 3 | 0 | 5 | 260 | 3.8 |
| 4 | 0 | 10 | 230 | 1.2 |
| 5 | 0 | 20 | 210 | .8 |
| 6 | 0.42 | 0 | 200 | 4 |
| 7 | 0.42 | 2 | 240 | 1.3 |
| 8 | 0.42 | 5 | 250 | .6 |
| 9 | 0.42 | 10 | 270 | .5 |
| 10 | 0.42 | 20 | 190 | .5 |

EXAMPLE V

This example illustrates the undesirable results obtained when iodinating poly(vinyl carbazole) with iodine.

A number of runs were made employing a low molecular weight poly(vinyl carbazole) obtained by the process disclosed in U.S. Pat. No. 3,679,637 and a high molecular weight poly(vinyl carbazole) obtained by the process of U.S. Pat. No. 3,679,645. The low molecular weight poly(vinyl carbazole) had a relative viscosity, as measured in a 1% solution of benzene at 25° C. of 1.2 while the high molecular weight poly(vinyl carbazole) had a relative viscosity of 1.8. Iodination was carried out with 10 grams of the poly(vinyl carbazole) and 6.7 grams iodine in the diluent shown in Table V.

TABLE V

| Sample | PVK | Diluent, 150 ml |
| --- | --- | --- |
| 1 | High M.W. | Acetic acid |
| 2 | Low M.W. | Heptane |
| 3 | Low M.W. | Acetic acid |
| 4 | High M.W. | Heptane |

In each instance, refluxing was conducted from a period of 18 to 20 hours; with the refluxing temperature for samples 1 and 3 being 115° C. and the refluxing temperature for samples 2 and 4 being 99° C. After refluxing was completed, the compositions were cooled and filtered and the recovered iodinated polymer was washed twice with two liters of the solvent employed during the refluxing. The washed polymer then was dried in a vacuum oven at 100° C. overnight (to constant weight). The iodinated samples have the appearance and iodine weight percent shown in Table VI.

TABLE VI

| Iodinated Sample | Wt., g | Appearance | I, wt% |
| --- | --- | --- | --- |
| 1 | 11.9 | Green powder | 10.2 |
| 2 | 10.7 | Dark Green powder | 9.7 |
| 3 | 11.6 | Dark Green powder | 9.5 |
| 4 | 10.6 | Green powder | 4.1 |

All of the iodinated samples dissolved in excess boiling ethylene dichloride in an amount less than 10 percent. Thus, each of the samples had too dark a color, too low an iodine concentration and too low a solubility to be useful as a photoconductive composition in the present invention.

What is claimed is:

1. The process for forming iodinated poly(vinyl carbazole) which comprises reacting a slurry of powdered poly(vinyl carbazole) in an acidic, nonaqueous diluent which is a nonsolvent for the poly(vinyl carbazole) with an alkali metal iodide selected from the group consisting of sodium iodide, potassium iodide and mixtures thereof and an alkali metal iodate selected from the group consisting of potassium iodate, sodium iodate and mixtures thereof, said powdered poly(vinyl carbazole) being prepared by precipitation polymerization and the amount of poly(vinyl carbazole) being regulated to form iodinated poly(vinyl carbazole) having a mol ratio of iodine to vinyl carbazole of about 0.05 to about 0.9.

2. The process of claim 1 wherein the alkali metal iodide is potassium iodide and the alkali metal iodate is potassium iodate.

3. The process of claim 1 wherein the powdered poly(vinyl carbazole) has a relative viscosity above about 1.2 when measured at a 1% concentration in benzene at 25° C.

4. The process of claim 1 carried out in a manner to avoid a stoichiometric excess of iodate to iodide for forming iodine in the reaction medium.

5. The process of claim 4 wherein the powdered poly(vinyl carbazole) has a relative viscosity above about 1.2 when measured in a 1% concentration in benzene at 25° C.

6. The process of claim 4 in which the amount of poly(vinyl carbazole) is regulated to form iodinated poly(vinyl carbazole) having a mol ratio of iodine to vinyl carbazole of between about 0.1 and about 0.5.

7. The process of claim 1 in which the reaction is carried out at a temperature between about 70° and 125° C.

* * * * *